(12) United States Patent
Wang (10) Patent No.: US 11,422,440 B2
(45) Date of Patent: *Aug. 23, 2022

(54) IMAGE STABILIZATION APPARATUS AND CONTROL METHOD THEREOF

(71) Applicant: SZ DJI OSMO TECHNOLOGY CO., LTD., Shenzhen (CN)

(72) Inventor: Yan Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,975

(22) Filed: Sep. 15, 2020

(65) Prior Publication Data

US 2020/0409244 A1 Dec. 31, 2020

Related U.S. Application Data

(63) Continuation of application No. 16/190,657, filed on Nov. 14, 2018, now Pat. No. 10,788,736, which is a
(Continued)

(51) Int. Cl.
*G03B 17/56* (2021.01)
*F16M 11/04* (2006.01)
(Continued)

(52) U.S. Cl.
CPC ......... *G03B 17/563* (2013.01); *F16M 11/041* (2013.01); *F16M 11/10* (2013.01);
(Continued)

(58) Field of Classification Search
USPC ....................................... 396/55; 348/208.99
See application file for complete search history.

(56) References Cited

U.S. PATENT DOCUMENTS 7,642,741 B2 * 1/2010 Sidman ................ G03B 17/561
318/649
8,179,078 B2 * 5/2012 Sidman ................ F16M 11/041
318/649
(Continued)

FOREIGN PATENT DOCUMENTS

CN 101858476 A 10/2010
CN 204420520 U 6/2015
(Continued)

OTHER PUBLICATIONS

The World Intellectual Property Organization (WIPO) International Search Report for PCT/CN2016/084104 dated Feb. 27, 2017 6 Pages.

*Primary Examiner* — Clayton E. LaBalle
*Assistant Examiner* — Warren K Fenwick
(74) *Attorney, Agent, or Firm* — Anova Law Group, PLLC (57) ABSTRACT

A method for controlling an image stabilization apparatus includes detecting a motion status of a handle of the image stabilization apparatus. A rotation of the handle is controlled by a rotary axis motor of the image stabilization apparatus. The method further includes controlling the rotary axis motor to stop rotating in response to the motion status of the handle being a free status in which the handle is not fixed and one portion of the image stabilization apparatus other than the handle is fixed.

20 Claims, 3 Drawing Sheets

Related U.S. Application Data continuation of application No. PCT/CN2016/084104, filed on May 31, 2016.

(51) Int. Cl.

| | | |
|---|---|---|
| *H04N 5/232* | (2006.01) | |
| *F16M 11/20* | (2006.01) | |
| *F16M 11/10* | (2006.01) | |
| *F16M 11/12* | (2006.01) | |
| *F16M 11/18* | (2006.01) | |
| *F16M 13/00* | (2006.01) | |
| *F16M 13/04* | (2006.01) | |

(52) U.S. Cl.
CPC ........... *F16M 11/123* (2013.01); *F16M 11/18* (2013.01); *F16M 11/2071* (2013.01); *F16M 13/00* (2013.01); *F16M 13/04* (2013.01); *G03B 17/561* (2013.01); *H04N 5/2328* (2013.01); *H04N 5/23258* (2013.01); *H04N 5/23261* (2013.01); *F16M 2200/041* (2013.01); *F16M 2200/044* (2013.01)

(56) References Cited

U.S. PATENT DOCUMENTS

| | | | |
|---|---|---|---|
| 10,788,736 B2 * | 9/2020 | Wang | H04N 5/2328 |
| 2004/0130657 A1 | 7/2004 | Hsu | |
| 2015/0261070 A1 * | 9/2015 | Feng | G03B 17/561 |
| | | | 396/421 |

FOREIGN PATENT DOCUMENTS

| | | |
|---|---|---|
| CN | 204666122 U | 9/2015 |
| CN | 105090695 A | 11/2015 |
| CN | 105223967 A | 1/2016 |
| CN | 204989728 U | 1/2016 |
| CN | 205176664 U | 4/2016 |
| GB | 2387667 A | 10/2003 |
| GB | 2521865 A | 7/2015 |

\* cited by examiner

IMAGE STABILIZATION APPARATUS AND CONTROL METHOD THEREOF

CROSS-REFERENCE TO RELATED APPLICATION

This application is a continuation application of U.S. application Ser. No. 16/190,657 filed on Nov. 14, 2018, which is a continuation application of International Application No. PCT/CN2016/084104, filed on May 31, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

TECHNICAL FIELD

The present disclosure relates to the field of photographing technology and, more particularly, to an image stabilization apparatus and a control method thereof.

BACKGROUND

An image stabilization apparatus is a fixing apparatus for carrying or supporting a photographing device. An image stabilization apparatus may also be referred to as a "gimbal." After a photographing apparatus is installed on the image stabilization apparatus, a photographing angle of the photographing device can be adjusted by controlling the image stabilization apparatus.

When the photographing device is used to capture images, an operation of an user or an external factor may cause the photographing device to shake. In order to ensure that images captured by the photographing device are stable, a negative feedback system can be configured for the image stabilization device. The negative feedback system can control the image stabilization apparatus to perform a motion opposite to a motion direction of the image stabilization device, by detecting a motion status of the photographing device installed on the image stabilization apparatus. Thus, shaking of the photographing device may be suppressed, and stabilization of image captured by the photographing device may be ensured.

A generally used image stabilization apparatus may be a three-axis image stabilization apparatus. An operator usually holds a handle connected to the image stabilization apparatus to operate the image stabilization apparatus, and thus to control the photographing apparatus to align with a needed photographing direction. However, if the user holds another portion of the image stabilization apparatus to fix the photographing apparatus and thus to cause the handle to stay at a free status, the negative feedback system causes each shaft motor of the image stabilization apparatus to rotate, in order to suppress the shaking of the photographing device. As the photographing device is fixed by a user, but the handle is at a free status, the motor may be caused to rotate continuously but still cannot suppress the shaking of the photographing device. Accordingly, uncontrolled swings of the handle may occur. Uncontrolled swings of the handle can disturb the use of the photographing device to capture images by the user. Further, because the handle may be generally provided with a rotation limiting apparatus, the uncontrolled swings of the handle may also cause the image stabilization apparatus to be damaged.

SUMMARY

In accordance with the disclosure, there is provided a method for controlling an image stabilization apparatus including detecting a motion status of a handle of the image stabilization apparatus. A rotation of the handle is controlled by a rotary axis motor of the image stabilization apparatus. The method further includes controlling the rotary axis motor to stop rotating in response to the motion status of the handle being a free status in which in which the handle is not fixed and one portion of the image stabilization apparatus other than the handle is fixed.

Also in accordance with the disclosure, there is provided an image stabilization apparatus including a handle status detector and a photographing apparatus motion control assembly. The photographing apparatus motion control assembly includes a handle, a rotary axis motor coupled to the handle and configured to control a rotation of the handle, and a processor. The processor is configured to receive a motion status of the handle from the handle status detector and control the rotary axis motor to stop rotating in response to the motion status of the handle being a free status in which the handle is not fixed and one portion of the image stabilization apparatus other than the handle is fixed.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Figure 1:
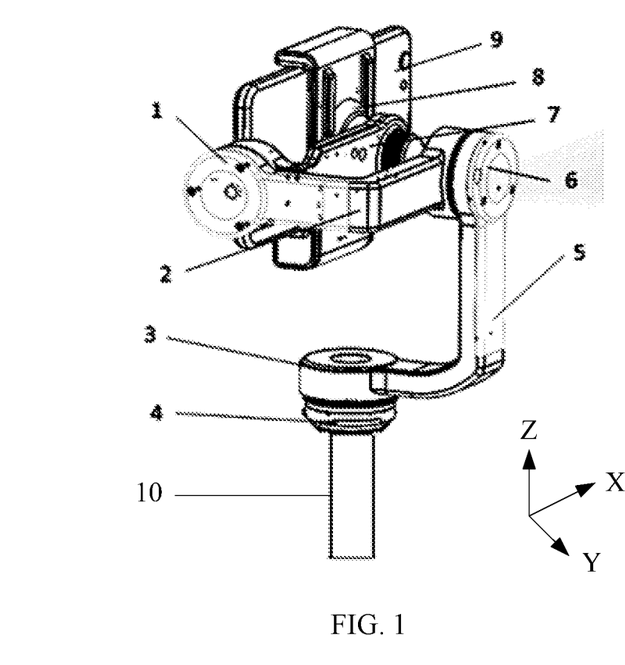
FIG. 1 is a schematic view of a three-axis image stabilization apparatus.

FIG. 1 is a schematic view of a three-axis image stabilization apparatus. As shown in FIG. 1, the three-axis image stabilization apparatus may provide axial adjustment capabilities in three directions, e.g., the X, Y, and Z directions, for an apparatus held by the three-axis image stabilization apparatus. The image stabilization apparatus includes a Y-axis motor 1, an X-axis motor 6, a Z-axis motor 3, a Y-axis arm 7 rotatably connected to the Y-axis motor 1, an X-axis arm 2 rotatably connected to the X-axis motor 6, and a Z-axis arm 5 rigidly connected to the Z-axis motor 3. The Y-axis motor 1, the X-axis motor 6, and the Z-axis motor 3 can cause the Y-axis arm 7, the X-axis arm 2, and the Z-axis arm 5 to rotate around Y axis, X axis, and Z axis, respectively. The Z-axis arm 5 is further rigidly connected to the X-axis motor 6. The X-axis arm 2 is further rigidly connected to the Y-axis motor 1. One end of the Y-axis arm 7 that is distal from the Y-axis motor 1 is connected to a photographing apparatus fixing mechanism 8 for securely mounting a photographing apparatus 9 to the image stabilization apparatus. The Z-axis motor 3 is further rotatably connected to a base 4, and a handle 10 is rigidly connected to the base 4.

When the user uses the three-axis image stabilizing apparatus, the user may use the photographing apparatus fixing mechanism 8 to securely attach the photographing apparatus 9 to the image stabilization apparatus, hold the handle 10 by hand, and use the photographing apparatus 9 to perform photographing. The Y-axis arm 7 or the fixing mechanism 8 includes a photographing apparatus motion status detector, i.e., a detector for detecting a motion status of a photographing apparatus attached to the image stabilization apparatus, such as the photographing apparatus 9. In some embodiments, the photographing apparatus motion status detector may include, for example, an inertial measurement unit. The motion status detector can detect an attitude of the photographing apparatus 9. During photographing, the user may adjust an attitude of the photographing apparatus 9 according to various photographing needs. In response to the motion detector detecting that an actual attitude of the photographing apparatus 9 is not consistent with a target attitude that the photographing apparatus needs to be adjusted to, the image stabilization apparatus may control the Y-axis motor 1, the X-axis motor 6, and the Z-axis motor 3 to rotate separately, such that a current attitude of the photographing apparatus 9 may be adjusted to the target attitude to which the photographing apparatus needs to be adjusted.

If the user uses the image stabilization apparatus shown in FIG. 1 without holding the handle 10, but holds another portion of the image stabilization apparatus, correspondingly, when the motion status detector for the photographing apparatus detects that a current attitude of the photographing apparatus 9 is not consistent with a target attitude and the Z-axis motor 3 needs to controlled to rotate, the Z-axis motor 3 cannot cause the Z-axis arm 5 to rotate around the Z axis, but may cause the base 4 and the handle 10 rigidly connected to the base 4 to rotate around the Z axis. Correspondingly, since the Z-axis arm 5 cannot rotate around the Z-axis, the image stabilization apparatus cannot adjust the current attitude of the photographing apparatus 9 to the target attitude. However, the image stabilization apparatus may continue attempting to adjust the current attitude of the photographing apparatus, and thus continue causing the Z-axis motor to rotate, thereby resulting in uncontrolled swings of the handle 10.

The uncontrolled swing of the handle 10 may disturb normal use of the user, and may even result in harms to the user. For example, each motor generally may have a position limiting mechanism. That is, the motor can rotate only within a certain range. Thus, the uncontrolled swings of the handle 10 may also cause the Z-axis motor 3 to rotate too fast. If the Z-axis motor 3 hits the corresponding position limiting mechanism at a high speed, a damage to the position limiting mechanism may occur, and the entire image stabilization apparatus may be damaged.

Figure 2:
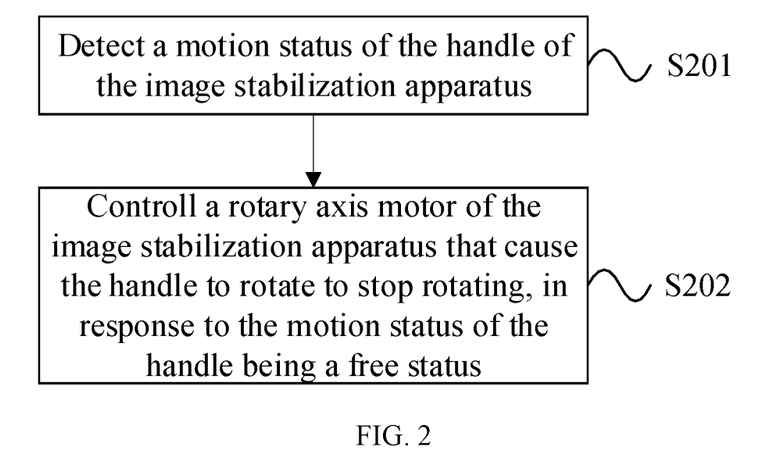
FIG. 2 is a flowchart of an exemplary control method for controlling an image stabilization apparatus according to various disclosed embodiments of the present disclosure.

FIG. 2 is a flowchart of an exemplary control method for controlling an image stabilization apparatus according to various disclosed embodiments of the present disclosure. With reference to FIG. 2, the method is described below.

At S201, a motion status of the handle of the image stabilization apparatus is detected.

The control method consistent with the disclosure may be applicable to any image stabilization apparatus capable of adjusting a motion attitude of an installed photographing apparatus in at least one direction. A handle may be connected in one direction along which the motion attitude is adjustable. The image stabilization apparatus may be securely attached to the photographing apparatus. By detecting the attitude of the photographing apparatus and by controlling the motion attitude adjustment mechanism for at least one direction, an attitude of the photographing apparatus may be adjusted to a target attitude.

As described above, if a portion other than the handle of the image stabilization apparatus is fixed but the handle is not fixed, uncontrolled swings of the handle may occur. In order to suppress such uncontrolled swings, in some embodiments, a motion status of the handle of the image stabilization apparatus may also be detected, in addition to an attitude of the photographing apparatus connected to the image stabilization apparatus being detected.

By detecting the motion status of the handle of the image stabilization apparatus, whether the motion status of the handle is a free status may be detected, i.e., whether the handle is at the free status may be detected, where the free status may refer to a status in which the handle is not fixed and one portion of the image stabilization apparatus other than the handle is fixed. Whether the handle of the image stabilization apparatus is at the free status can be detected by various approaches, such as detecting whether the handle is held or detecting whether the motion status of the handle satisfies a motion status feature for the handle not being held.

At S202, in response to the motion status of the handle being a free status, a rotary axis motor of the image stabilization apparatus that cause the handle to rotate is controlled to stop rotating.

In some embodiments, in response to detecting that the handle of the image stabilization apparatus is the free status, in order to prevent the uncontrolled swings of the handle from disturbing the normal use of the user or to prevent the uncontrolled swings of the handle from causing the rotary axis motor for driving the handle to collide with and thus damage the position limiting mechanism, the rotary axis motor for effecting a rotation of the handle and in the image stabilization apparatus may be controlled to stop rotating. That is, the rotation of the rotary axis motor may be forcibly stopped, or power of the rotary axis motor may be cut off. After the rotary axis motor for effecting the rotation of the handle stops rotating, the uncontrolled swings of the handle can be suppressed. Accordingly, the normal use of the user can be ensured, and damages to the position limiting mechanism of the image stabilization apparatus can be avoided.

Taking the three-axis image stabilization apparatus shown in FIG. 1 as an example, the control method for the image stabilization apparatus may include an adjustment on an attitude of the photographing apparatus 9 through the three-axis stabilization apparatus shown in FIG. 1, and further include detecting a motion status of the handle 10. In response to detecting that the motion status of the handle 10 is a free status, the Z-axis motor 3 connected to the handle 10 may be controlled to stop rotating. After the Z-axis motor 3 stops rotating, disturbance of uncontrolled swings of the handle 10 on the user operation or use can be suppressed, and the Z-axis motor 3 crashing the position limiting mechanism caused by the uncontrolled swings of the handle 10 can be suppressed.

In a control method for an image stabilization apparatus consistent with the present disclosure, a motion status of a handle of the image stabilization apparatus may be detected, and, in response to the motion status of the handle being a free status, a rotary axis motor of the image stabilization apparatus that effects a rotation of the handle may be controlled to stop rotating. Thus, disturbance of uncontrolled swings of the handle on user's normal use of the image stabilization apparatus caused by the handle being at the free status may be suppressed, and damage to the position limiting mechanism of the image stabilization apparatus caused by uncontrolled swings of the handle may be suppressed.

In some embodiments, various approaches may be used for detecting the motion status of the handle of the image stabilization apparatus. Some exemplary approaches described below are taken as examples to illustrate approaches for detecting a motion status of the handle in detail.

Approaches for detecting the motion status of the handle usually can be categorized into two types. One type can include detecting whether the handle is held by the user. Further, a motion status of the handle at the free status differs from a motion status of the handle at a non-free status. Thus another type can include detecting whether the motion status of the handle is consistent with a motion status feature corresponding to the free status.

As the handle is held by the user, the handle may be subject to a certain amount of pressure. Thus, whether the handle is held by the user can be detected by arranging a pressure sensor at the handle and detecting a pressure that the handle is subject to using the pressure sensor. If a holding pressure at the handle is less than a preset threshold or the holding pressure is approximately 0, it can be determined that the handle is not held, and it can be determined that the handle is at the free status. In some embodiments, a touch switch may be arranged at the handle. When the handle is held, the touch switch may be activated to close. If the touch switch of the handle is not closed, it can be determined that a touch status of the handle is a status of not being touched. That is, it can be determined that the handle is at the free status. In some embodiments, a temperature sensor may be arranged at the handle. When the handle is held, the temperature sensor may detect a body temperature of the user holding the handle. If the temperature sensor detects a temperature that is not consistent with a human body temperature, it can be determined that the handle is at the free status.

The above-described detection approaches are merely for illustrating how to detect whether the handle is held. The control method for the image stabilization apparatus consistent with the present disclosure are not limited to the above-described detection approaches, and may include any approaches that can detect whether the handle is held.

When the handle of the image stabilization apparatus is held, the user holding the handle may provide resistance to a rotation of the handle. When the handle is at the free status, the resistance provided by the user holding the handle may disappear. Thus, a motion status of the handle at the free status may differ from a motion status of the handle not at the free status. Because an image stabilization apparatus may have a relatively fixed structure, a motion status of the handle at the free status may have a certain feature. Feature of the motion status of the handle when the handle is at a free status can be measured in advance. Further, a motion status of the handle may be detected during the operation or use to determine whether the motion status of the handle is consistent with the feature of the free status that is measured in advance, and thus to determine whether the handle is at the free status.

Figure 3:
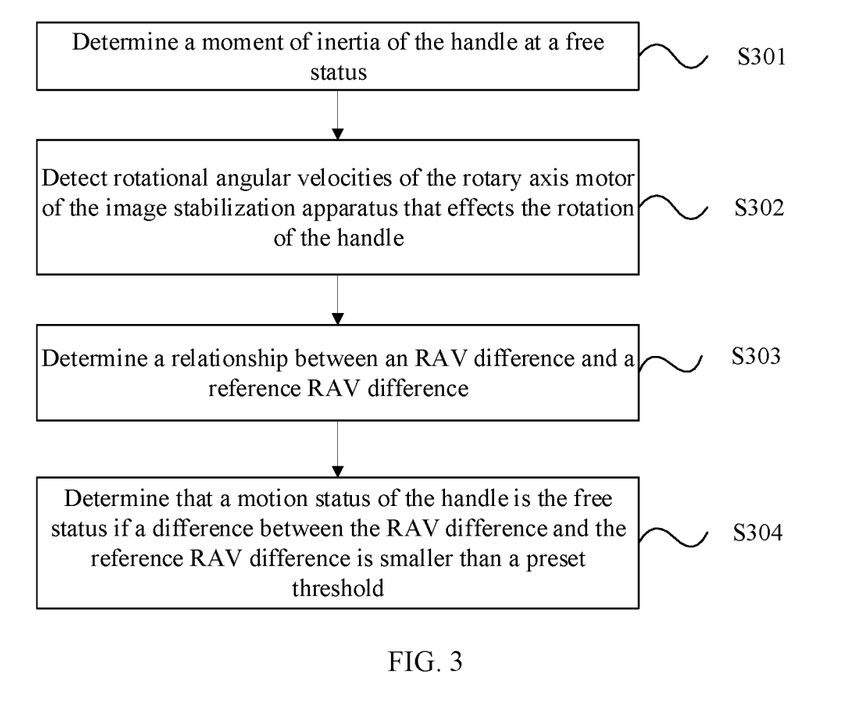
FIG. 3 is a flowchart of another exemplary control method for controlling an image stabilization apparatus according to various disclosed embodiments of the present disclosure.

An example is described below to illustrate an approach to determine whether the handle is at the free status according to a motion status of the handle. FIG. 3 is a flowchart of another exemplary control method for controlling an image stabilization apparatus according to various disclosed embodiments of the present disclosure. With reference to FIG. 3, the method is described below.

At S301, a moment of inertia of the handle at a free status is determined.

In some embodiments, because the image stabilization apparatus may have a relatively fixed structure, when the handle is at the free status, the moment of inertia during rotation may be approximately a constant. Thus, the moment of inertia of the handle when the handle is at the free status may be determined in advance.

In some embodiments, the moment of inertia of the handle at the free status can be determined as follows. At a time when the handle of the image stabilization apparatus is in a stationary status but not fixed, and one portion of the image stabilization apparatus other than the handle is fixed, a rotary axis motor for effecting the rotation of the handle may be provided with a rotating torque M, also referred to as a "rotative moment." After the handle rotates for a duration of time t, a rotation angle a of the motor may be obtained. The moment of inertia J of the handle at the free status may be calculated according to the formula $$a = \frac{M}{J \times \frac{t^2}{2}}.$$

At S302, rotational angular velocities (RAVs) of the rotary axis motor of the image stabilization apparatus that effects the rotation of the handle in the image stabilization apparatus may be detected.

In some embodiments, after the moment of inertia of the handle at the free status is determined, the motion status of the handle can be detected at a plurality of time points during the use of the image stabilization apparatus. The rotational angular velocities of the rotary axis motor that effects the rotation of the handle in the image stabilization apparatus may be detected.

Detecting the rotational angular velocities of the rotary axis motor that effects the rotation of the handle may include, for example, a repeatedly process. For example, in the image stabilization apparatus, a rotational angular velocity $\omega 0$ at a time point $t_0$ to a rotational angular velocity $\omega_n$ at time $t_n$ of the rotary axis motor for effecting the rotation of the handle may be detected separately, where n=1, 2, . . . , m, and m is the number of measurements for measuring the rotational angular velocity of the motor. That is, when the rotary axis motor that effects the rotation of the handle rotates, the rotational angular velocity of the rotary axis motor may be measured repeatedly to obtain corresponding rotational angular velocities corresponding to a plurality of time points.

At S303, a relationship between an RAV difference and a reference RAV difference is determined. Here, the RAV difference refers to a difference value between the rotational angular velocities of the motor at two measurement time points, and the reference RAV difference refers to a quotient of an integral of rotational torque of the motor between the two measurement time points divided by the moment of inertia of the handle at the free status.

In some embodiments, after a plurality of rotational angular velocities are obtained, the RAV difference $\omega_{q-p}$ between rotational angular velocities $\omega_q$ and $\omega_p$ of the motor at two adjacent measurement points p and q may be calculated according to the formula $\omega_{q-p}=\omega_q-\omega_p$ where p=0, 1, 2, . . . , m−1, and q=1, 2, . . . , m.

Further, the reference RAV difference $W_A$ can be calculated by dividing an integral of the rotating torque M of the motor over the time period between the two adjacent measurement time points by the moment of inertia J of the handle at the free status, i.e., $$\omega_\Delta = \frac{\int_{t_p}^{t_q} M \times dt}{J},$$

where $t_p$ and $t_q$ refer to the times at the adjacent measurement points p and q, respectively, and $t_q-t_p=t_\Delta$ refers to a measurement period of measuring the rotational angular speed of the motor, i.e., a time interval between every two measurements. Rotating torque M of the motor may be inputted into the motor and may be obtained from the motor.

A difference between $\omega_{q-p}$ and $\omega_\Delta$ between every two measurement time points may be calculated, and may be used to determine a motion status of the handle.

At S304, if the difference between the RAV difference and the reference RAV difference is smaller than a preset threshold, it is determined that the motion status of the handle is the free status.

In some embodiments, from the measurement number 0 to the measurement number m, the difference between the RAV difference $\omega_{q-p}$ and the reference RAV difference $\omega_\Delta$ of every two adjacent measurement points p and q is calculated. Such a difference is also referred to as an RAV-Q difference. By performing such calculation over the measurement time points, a plurality of RAV-Q differences, such as a total of m RAV-Q differences, can be obtained, and an amount of RAV-Q differences that are smaller than the preset threshold may be determined. In some embodiments, if the amount of RAV-Q differences that are smaller than the preset threshold is larger than a threshold amount, it can be determined that the current motion status of the handle is consistent with a motion status of the handle at the free status, and thus it can be determined that the motion status of the handle is the free status.

In some embodiments, "amount" can refer to a counted number. That is, determining whether the amount of RAV-Q differences smaller than the preset threshold is larger than the threshold amount may include determining whether a number of RAV-Q differences smaller than the preset threshold is larger than a threshold number. In some other embodiments, "amount" can refer to a ratio. That is, determining whether the amount of RAV-Q differences smaller than the preset threshold is larger than the threshold amount may include determining whether a ratio of the number of RAV-Q differences smaller than the preset threshold to the total number of calculated RAV-Q differences is larger than a threshold ratio.

Still taking the three-axis image stabilization apparatus shown in FIG. 1 as an example, in some embodiments, in the method for determining whether the handle is at the free status, the moment of inertia of the handle 10 at the free status may be determined. Correspondingly, a rotational torque M may need to be inputted to the Z-axis motor 3 to effect the rotation of the handle 10 while the handle 10 is at a stationary status but not fixed and one portion other than the handle 10, e.g., the X-axis arm, is fixed. Further, after the handle 10 has rotated for a time duration t, a rotation angle "a" of the Z-axis motor 3 may be obtained, such that the moment of inertia J of the handle 10 at the free status may be calculated according to the formula. The moment of inertia J of the handle 10 at the free status may be recorded as an intrinsic property of the image stabilization apparatus. Further, a motion status of the handle 10 may be detected under a normal operation condition of the image stabilization apparatus. That is, the rotation angular velocity of the Z-axis motor 3 at each measurement time point may be detected. Further, it may be determined whether the motion status of the handle 10 is the free status according to the rotation angular velocity of the Z-axis motor 3, the rotating torque of the Z-axis motor 3, and the moment of inertia J of the handle 10 at the free status.

By detecting the motion status of the handle to detect whether the handle is at a free status, there is no need to arrange other sensors or detecting apparatuses at the image stabilization apparatus, and thus cost may be reduced.

Further, an actual photographing operation may usually be performed after a photographing apparatus is connected to the image stabilization apparatus. After the photographing apparatus is connected to the image stabilization apparatus, the detection and adjustment of the image stabilization apparatus may be relatively useful. Further, an attitude detection and an automatic adjustment on the photographing apparatus may be activated, after the photographing apparatus is connected to the image stabilization apparatus. If the image stabilization apparatus has not started the attitude detection and the automatic adjustment on the photographing apparatus, uncontrolled swings of the handle may not occur, and a motion status of the handle may not need to be detected. Thus, before the motion status of the handle of the image stabilization apparatus is detected, it may be determined whether the image stabilization apparatus is connected to the photographing apparatus. In response to the photographing apparatus being connected to the image stabilization apparatus, a motion status of the image stabilization apparatus may be detected. Thus, unnecessary detection of the motion status of the handle may be prevented, and power of the image stabilization apparatus may be saved.

In process S202 shown in FIG. 2, when the motion status of the handle is the free status, a rotary axis motor of the image stabilization apparatus for effecting the rotation of the handle may be controlled to stop rotating. As such, the disturbance of the undesired swings of the handle on the user may be suppressed, and damage to the position limiting mechanism caused by an excessively high rotation speed and an excessively large rotation range of the motor for effecting the rotation of the handle may be suppressed.

In some scenarios, uncontrolled swings of the handle may not disturb the user, or the user may not be concerned much about the disturbance of the uncontrolled swings. In these scenarios, if the motor connected to the handle is stopped, an automatic adjustment function of the image stabilization apparatus may be disturbed, thereby causing relatively more disturbance on the user. Thus, in these scenarios, when it is detected that the motion status of the handle is the free status, it may be further detected whether the rotation range of the rotary axis motor effecting the rotation of the handle exceeds a preset threshold range. In some embodiments, when the handle is at the free status and the rotation range of the rotary axis motor for effecting the rotation of the handle exceeds the preset threshold range, the motor may be stopped to prevent the rotation of the motor from damaging the position limiting mechanism. In some scenarios, there may be no limit on the rotation range of the motor effecting the rotation of the handle, e.g., the motor may not have a position limiting mechanism, or the rotation range of the motor has not exceeded the preset threshold range, the motor may not need to be stopped, such that the image stabilization apparatus can maintain a normal operation while ensuring no damage to the image stabilization apparatus.

Further, in a normal operation of the image stabilization apparatus, the handle may be held by the user. The handle being at the free status may indicate that the user may be at an abnormal operating status. In order to prompt the user to correctly operate the image stabilization apparatus, in response to detecting that the motion status of the handle is the free status, a prompt message may be sent. The prompt message may be presented by various means such as sound, light, vibration, and/or the like. A prompt message may also be sent to the photographing apparatus connected to the image stabilization apparatus. The photographing apparatus may prompt the user that the current handle is at the free status by various means such as sound, image, text, light, and/or the like, such that the user may be informed of the information and may switch to operate the image stabilization apparatus in a normal operation mode.

Figure 4:
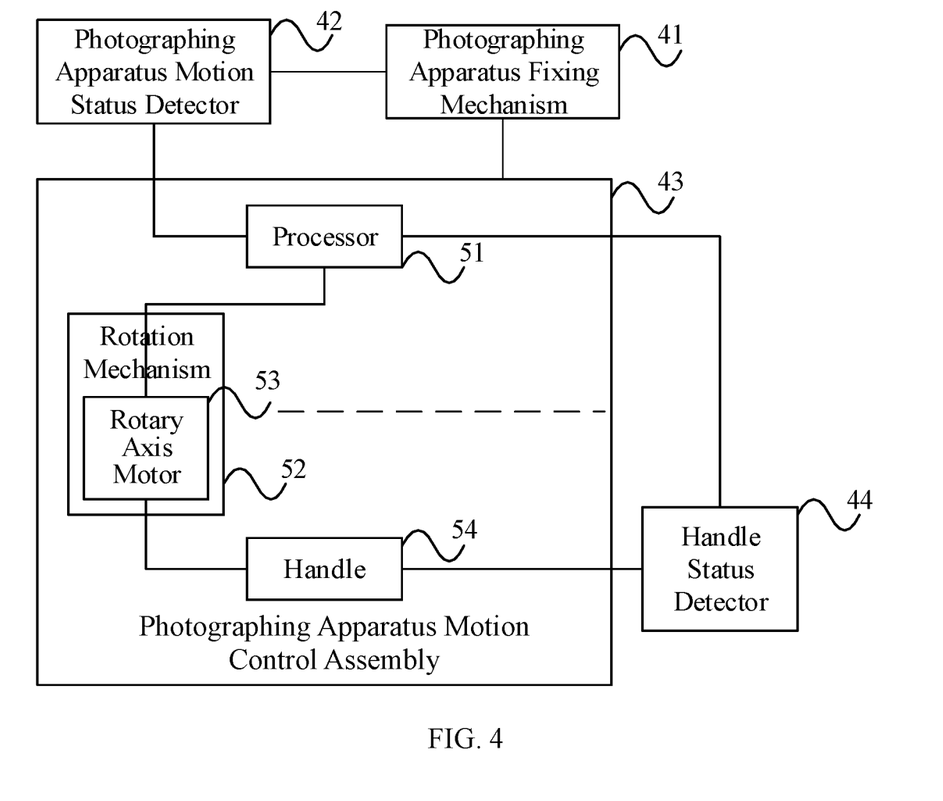
FIG. 4 is a block diagram of an exemplary image stabilization apparatus according to various disclosed embodiments of the present disclosure.

FIG. 4 is a block diagram of an exemplary image stabilization apparatus according to various disclosed embodiments of the present disclosure. As shown in FIG. 4, the image stabilization apparatus includes a photographing apparatus fixing mechanism 41, a photographing apparatus motion status detector 42, and a photographing apparatus motion control assembly 43. The photographing apparatus motion control assembly 43 includes a process 51 and at least one rotation mechanism 52 of different direction(s). Each rotation mechanism 52 corresponding to one direction includes a rotary axis motor 53, where one rotary axis motor 53 corresponding to one direction may effect a rotation of the handle 54.

The photographing apparatus fixing mechanism 41 may be configured to securely attach a photographing apparatus to the image stabilization apparatus. The photographing apparatus motion status detector 42 may be configured to detect a current attitude of the photographing apparatus, and send the current attitude, e.g., information indicating the current attitude, of the photographing apparatus, to the processor 51. The processor 51 may be configured to perform attitude control on the photographing device. In some embodiments, the processor 51 may be configured to determine a difference between a current attitude and a target attitude of the photographing apparatus, and to control at least one rotary axis motor 53 of different direction(s), such that the difference between the current attitude and the target attitude of the photographing device may be eliminated.

The image stabilization apparatus further includes a handle status detector 44 for detecting a motion status of the handle 54. The processor 51 may be further configured to, in response to the handle status detector 44 detecting that the motion status of the handle 54 is a free status, control the rotary axis motor 53 of the image stabilization apparatus that is connected to the handle 54 to stop rotating. The motion status of the handle 54 being at the free status may refer to that the handle 54 is not fixed and one portion of the image stabilization apparatus other than the handle 54 is fixed.

In some embodiments, the photographing apparatus fixing mechanism 41, the photographing apparatus motion status detector 42, and the photographing apparatus motion control assembly 43 may constitute a basic structure of the image stabilization apparatus, and can perform detection and automatic adjustment on the attitude of the photographing apparatus. The handle status detector 44 may cooperate with the processor 51 to perform a control method for an image stabilization apparatus, such as the method shown in FIG. 2. How to perform the method can be referenced to the above descriptions, descriptions of which are omitted here.

In some embodiments, the photographing apparatus motion status detector 42 may include, for example, a potentiometer or a Hall sensor provided at a rotary axis connected to each rotary axis motor. An attitude of the image stabilization apparatus may be calculated by detecting a rotating angle of each rotary axis motor. That is, a current attitude of the photographing apparatus may be obtained.

Further, in an implementation approach of examples described in connection with FIG. 4, the handle status detector 44 may include a hold sensor configured to detect whether the handle 54 is held, and the processor 51 may be configured to, in response to the hold sensor detecting that the handle 54 is not held, determine that the motion status of the handle 54 is at a free status. The hold sensor may include, for example, a pressure sensor and/or a touch switch. The pressure sensor and/or the touch switch may be arranged at the handle 54. The pressure sensor may be configured to detect a hold pressure at the handle 54. In response to the hold pressure at the handle 54 being less than a preset threshold, it may be determined that the handle 54 is not held. The touch switch may be configured to detect a touch status of the handle 54. In response to the touch status is a status of not being touched, it may be determined that the handle 54 is not held. The handle status detector 44 may include another type of detector and/or sensor. The handle status detector 44 may include any sensor or detector that can detect whether the handle is held, such as a temperature sensor. If the handle status detector 44 includes a temperature sensor, when the handle is held, the temperature sensor may detect a body temperature of the user holding the handle. If the temperature sensor detects a temperature that is not consistent with a human body temperature, it can be determined that the handle is at the free status.

Further, in another implementation approach of examples described in connection with FIG. 4, the handle status detector 44 may be configured to detect whether a motion status of the handle 54 is consistent with a pre-determined free status, i.e., a free status determined in advance, and the processor 51 may be configured to, in response to the handle status detector 44 detecting that the motion status of the handle 54 is consistent with the pre-determined free status, determine that the motion status of the handle 54 is at the free status. In some embodiments, the processor 51 may be further configured to determine a moment of inertia of the handle 54 at the free status. The handle status detector 44 may be configured to detect a rotational angular velocity of a rotary axis motor 53 of the image stabilization apparatus that is connected to the handle 54. The processor 51 may be configured to calculate a relationship between an RAV difference and a reference RAV difference between two measurement time points. As described above, the RAV difference between the two measurement time points refers to a difference value between rotational angular velocities of the rotary axis motor 53 at the two measurement time points, and the reference RAV difference refers to a quotient of an integral of rotational torques of the rotary axis motor 53 between the two measurement time points divided by a moment of inertia of the handle 54 at the free status. If an RAV-Q difference between the RAV difference and the reference RAV difference is smaller than a preset threshold, it may be determined that the motion status of the handle 54 is the free status.

In another implementation approach of examples described in connection with FIG. 4, the processor 51 may be further configured to determine whether the image stabilization apparatus is connected to a photographing device, before the handle status detector 44 detects the motion status of the handle 54 of the image stabilization apparatus. The handle status detector 44 may be configured to detect the motion status of the handle 54 of the image stabilization apparatus, in response to the processor 51 determining that the image stabilization apparatus is connected to the photographing apparatus.

In another implementation approach of examples described in connection with FIG. 4, the processor 51 may be configured to control the motor 53 of the rotary axis of the image stabilization apparatus that is connected to the handle 54 and that has a rotation range exceeding a preset threshold range to stop rotating, in response to the handle status detector 44 detecting that the motion status of the handle 54 is the free status.

In another implementation approach of examples described in connection with FIG. 4, the processor 51 may be further configured to send a prompt message in response to the handle status detector 44 detecting that the motion status of the handle 51 is the free status. The prompt message may include indication information indicating that the handle of the image stabilization apparatus is at the free status.

In some embodiments, the processor 51 may be configured to input a rotating torque M to a rotary axis motor that drives the handle to rotate, while the photographing apparatus connected to the image stabilization apparatus is fixed and the handle is stationary but not fixed. After the handle has rotated for a time duration t, the processor 51 can obtain a rotation angle a of the motor and calculate a moment of inertia J of the handle at the free status according to $$a = \frac{M}{J \times \frac{t^2}{2}}.$$

The handle status detector 44 may be configured to separately detect a rotational angular velocity $\omega_0$ at a time point $t_0$ to a rotational velocity $\omega_n$ at time $t_n$ of the rotary axis motor of the image stabilization apparatus that effects the rotation of the handle, where n=1, 2, . . . , m, and m is the number of measurements for measuring the rotational angular velocity of the motor. The processor 51 may be configured to calculate, according to the formula $\omega_{q-p}=\omega_q-\omega_p$, the RAV difference between the rotational angular velocities $\omega_q$ and $\omega_p$ of the motor at two adjacent time points $t_p$ and $t_q$, where p=0, 1, 2, . . . , m−1, q=1, 2, . . . , m. According to the formula $$\omega_\Delta = \frac{\int_{t_p}^{t_q} M \times dt}{J},$$

the reference RAV difference $\omega_\Delta$ can be calculated, where the numerator in the right of the equation is an integral of the rotational torque M of the motor between the two adjacent time points $t_p$ and $t_q$, and $t_\Delta$ is a measurement period for measuring the rotational angular velocity of the motor. Further, if, among the RAV-Q differences, between the RAV differences $\omega_{q-p}$ and the reference RAV differences $\omega_\Delta$ calculated over time points from $t_0$ to $t_m$, the amount of RAV-Q difference(s) that are smaller than the preset threshold is larger than a threshold amount, it may be determined that the motion status of the handle is the free status.

The present disclosure provides an image stabilization apparatus and a control method thereof. The control method may include detecting a motion status of a handle of the image stabilization apparatus and controlling a rotary axis motor of the image stabilization apparatus that effects a rotation of the handle to stop rotating, in response to a motion status of the handle being a free status. With the image stabilization apparatus and the control method thereof consistent with the disclosure, disturbance on the user caused by uncontrolled swings of the handle of the image stabilization apparatus at the free status may be suppressed. Further, a damage to a position limiting mechanism of the image stabilization apparatus caused by the uncontrolled swings of the handle may be suppressed.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method for controlling an image stabilization apparatus comprising:
   detecting a motion status of a handle of the image stabilization apparatus, a rotation of the handle being controlled by a rotary axis motor of the image stabilization apparatus; and
   controlling the rotary axis motor to stop rotating in response to the motion status of the handle being a free status, in which one portion of the image stabilization apparatus other than the handle is fixed and the handle is rotating.

2. The method according to claim 1, wherein detecting the motion status of the handle comprises:
   detecting whether the handle is held; and
   determining that the motion status of the handle is the free status in response to the handle not being held.

3. The method according to claim 1, further comprising:
   controlling the rotary axis motor to stop rotating in response to a rotation range of the rotary axis motor exceeding a threshold range.

4. The method according to claim 2, wherein detecting whether the handle is held comprises:
   detecting a hold pressure at the handle; and
   determining that the handle is not held in response to the hold pressure at the handle being smaller than a preset threshold.

5. The method according to claim 2, wherein detecting whether the handle is held comprises:
   detecting a touch status at the handle; and
   determining that the handle is not held in response to the touch status indicating the handle not being touched.

6. The method according to claim 1, wherein detecting the motion status of the handle comprises:
   detecting whether the motion status of the handle is consistent with a pre-determined free status; and
   determining that the motion status of the handle is the free status in response to the motion status of the handle being consistent with the pre-determined free status.

7. The method according to claim 6, further comprising, before detecting whether the motion status of the handle is consistent with the pre-determined free status:
   determining a moment of inertia of the handle at the free status;
   wherein detecting whether the motion status of the handle is consistent with the pre-determined free status comprises:
   detecting rotational angular velocities (RAVs) of the rotary axis motor at a plurality of measurement time points;
   calculating an RAV-Q difference between an RAV difference and a reference RAV difference, the RAV difference being a difference between the rotational angular velocities of the motor at two of the measurement time points, and the reference RAV difference being a quotient of an integral of a rotational torque of the motor over a time period between the two of the measurement time points divided by the moment of inertia of the handle at the free status; and
   determining whether the RAV-Q difference is smaller than a preset threshold.

8. The method according to claim 1, further comprising, before detecting the motion status of the handle of the image stabilization apparatus:
   determining whether a photographing apparatus is connected to the image stabilization apparatus;
   wherein detecting the motion status of the handle comprises:
   detecting the motion status of the handle in response to the photographing apparatus being connected to the image stabilization apparatus.

9. The method according to claim 1, further comprising:
   sending a prompt message in response to the motion status of the handle being the free status, the prompt message comprising indication information that indicates the handle being at the free status.

10. An image stabilization apparatus comprising:
    a handle status detector; and
    a photographing apparatus motion control assembly comprising:
    a handle;
    a rotary axis motor coupled to the handle and configured to control a rotation of the handle; and
    a processor configured to:
    receive a motion status of the handle from the handle status detector; and
    control the rotary axis motor to stop rotating in response to at least one portion of the image stabilization apparatus other than the handle is fixed and the motion status of the handle being a free status.

11. The apparatus according to claim 10, wherein:
    the handle status detector comprises a hold sensor configured to detect whether the handle is held; and
    the processor is further configured to determine that the motion status of the handle is the free status in response to the hold sensor detecting that the handle is not held.

12. The apparatus according to claim 11, wherein:
the hold sensor comprises a pressure sensor configured to detect a hold pressure at the handle; and
the processor is further configured to determine that the handle is not held in response to the hold pressure at the handle being smaller than a preset threshold.

13. The apparatus according to claim 11, wherein:
the hold sensor comprises a touch switch configured to detect a touch status at the handle; and
the processor is further configured to determine that the handle is not held in response to the touch status indicating the handle not being touched.

14. The apparatus according to claim 10, wherein the processor is further configured to:
control the rotary axis motor to stop rotating in response to a rotation range of the rotary axis motor exceeding a threshold range.

15. The apparatus according to claim 10, wherein:
the handle status detector is further configured to detect whether the motion status of the handle is consistent with a pre-determined free status; and
the processor is further configured to determine that the motion status of the handle is the free status in response to the handle status detector detecting that the motion status of the handle is consistent with the pre-determined free status.

16. The apparatus according to claim 15, wherein:
the handle status detector is further configured to detect rotational angular velocities (RAVs) of the rotary axis motor at a plurality of measurement time points; and
the processor is further configured to:
determine a moment of inertia of the handle at the free status,
calculate an RAV-Q difference between an RAV difference and a reference RAV difference, the RAV difference being a difference between the rotational angular velocities of the motor at two of the measurement time points, and the reference RAV difference being a quotient of an integral of a rotational torque of the motor over a time period between the two of the measurement time points divided by the moment of inertia of the handle at the free status; and
determine whether the motion status of the handle is consistent with the pre-determined free status by determining whether the RAV-Q difference is smaller than the preset threshold.

17. The apparatus according to claim 10, wherein:
the processor is further configured to determine, before the handle status detector detects the motion status of the handle, whether a photographing apparatus is connected to the image stabilization apparatus; and
the handle status detector is further configured to detect the motion status of the handle in response to the processor determining that the photographing apparatus is connected to the image stabilization apparatus.

18. The apparatus according to claim 10, wherein the processor is further configured to:
send a prompt message in response to the motion status of the handle being the free status, the prompt message comprising indication information that indicates the handle being at the free status.

19. The apparatus according to claim 10, wherein the rotary axis motor stops rotating to avoid uncontrolled swings of the handle.

20. The apparatus according to claim 10, wherein the image stabilization apparatus includes an X-axis motor, a Y-axis motor, and a Z-axis motor, an X-axis, an Y-axis, and an Z-axis forming a three dimensional Cartesian coordinate system with the X-axis and the Y-axis forming a horizontal plane, and the rotary axis motor is the Z-axis motor.

* * * * *